United States Patent
Bader et al.

(10) Patent No.: US 8,510,006 B2
(45) Date of Patent: Aug. 13, 2013

(54) METHOD FOR ADAPTING THE RAPID FILLING TIME OF A CLUTCH

(75) Inventors: Martin-Joachim Bader, Mochenwangen (DE); Karl Locher, Prongstetten-Tigerfeld (DE); Olaf Moseler, Werneck (DE); Markus Terwart, Thundorf (DE); Frank Veth, Oberthulba (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 13/515,952

(22) PCT Filed: Nov. 24, 2010

(86) PCT No.: PCT/EP2010/068077
§ 371 (c)(1), (2), (4) Date: Jun. 14, 2012

(87) PCT Pub. No.: WO2011/076509
PCT Pub. Date: Jun. 30, 2011

(65) Prior Publication Data
US 2012/0247910 A1    Oct. 4, 2012

(30) Foreign Application Priority Data
Dec. 21, 2009    (DE) .................. 10 2009 055 065

(51) Int. Cl.
*F16D 48/06*    (2006.01)
*G06F 17/00*    (2006.01)

(52) U.S. Cl.
USPC ........................... 701/68; 703/2; 192/85.63

(58) Field of Classification Search
USPC ............ 701/67, 68; 192/85.01, 85.63; 703/2
See application file for complete search history.

(56) References Cited

U.S. PATENT DOCUMENTS

| | | | | |
|---|---|---|---|---|
| 5,103,954 | A | * 4/1992 | Muncke et al. | 192/3.58 |
| 6,155,948 | A | * 12/2000 | Gierer | 475/123 |
| H2031 | H | 6/2002 | Harrell et al. | |
| 6,567,733 | B2 | * 5/2003 | Popp et al. | 701/51 |
| 6,569,060 | B2 | * 5/2003 | Rosi et al. | 477/156 |
| 6,672,990 | B2 | * 1/2004 | Netzer | 477/156 |
| 7,147,095 | B2 | 12/2006 | Kraxner et al. | |
| 2009/0209383 | A1 | 8/2009 | Olson et al. | |

FOREIGN PATENT DOCUMENTS

| | | |
|---|---|---|
| DE | 100 42 147 A1 | 7/2002 |
| DE | 101 34 294 A1 | 2/2003 |
| DE | 102 23 780 C1 | 10/2003 |
| DE | 102 27 361 A1 | 1/2004 |
| DE | 10 2005 042 933 A1 | 3/2007 |
| DE | 10 2008 000 015 A1 | 7/2009 |

\* cited by examiner

*Primary Examiner* — Russell Frejd
(74) *Attorney, Agent, or Firm* — Davis & Bujold, PLLC

(57) ABSTRACT

A method of adapting the rapid filling time of a clutch. During adaptation, the clutch is filled by at least two successive rapid filling pulses with increasing rapid filling times. For each rapid filling pulse a reaction, resulting from the filling pulse, is monitored. If a defined reaction, for one of the rapid filling pulses, is recognized for the first time whereas for the, or for each of the previous rapid filling pulse(s) the defined reaction was not observed, then as a function of the rapid filling time of that rapid filling pulse for which the defined reaction was recognized for the first time, carrying out the adaptation of the rapid filling time and, for each rapid filling pulse used for the adaptation, gradients of the clutch pressure produced as a result of the respective rapid filling pulse are evaluated to determine the defined reaction pressure.

13 Claims, 5 Drawing Sheets

METHOD FOR ADAPTING THE RAPID FILLING TIME OF A CLUTCH

This application is a National Stage completion of PCT/EP2010/068077 filed Nov. 24, 2010, which claims priority from German patent application serial no. 10 2009 055 065.8 filed Dec. 21, 2009.

FIELD OF THE INVENTION

The invention concerns a method for adapting the rapid filling time of a clutch.

BACKGROUND OF THE INVENTION

The main components of a drive-train of a motor vehicle are a drive aggregate and a transmission, the transmission of the drive-train being connected between the drive aggregate and a drive output. The transmission converts rotational speeds and torques, and thereby supplies the traction force provided by the drive aggregate, to the output of the drive-train. A transmission comprises shifting elements, and to carry out a shift operation or gearshift one shifting element is closed or engaged and at least one shifting element is opened or disengaged. The shifting elements of the transmission are preferably in the form of clutches.

Between the shifting elements of the transmission and the drive aggregate is connected at least one starting clutch. From DE 102 23 780 C1 a transmission with a hydraulically actuated multiple clutch is known, namely a hydraulically actuated double clutch, wherein therefore a plurality of clutches are connected between the shifting elements of the transmission and the drive aggregate, which serve as the starting clutch and/or as shifting elements.

To close a hydraulically actuated clutch serving as a shifting element or a starting clutch, the clutch is filled hydraulically. From DE 100 42 147 A1 it is already known that the filling of a clutch is divided into a rapid filling stage or rapid filling phase and a filling compensation stage or filling compensation phase, such that during both the rapid filling and the filling compensation phases filling parameters are adapted. A further method for adapting the filling of shifting elements of a transmission is known from the document DE 101 34 294 A1.

In the methods known from the prior art for adapting the filling of a clutch, action is exerted either on a motor speed or transmission input speed, or on a turbine speed of a converter. From this it follows that an adaptation result depends on influencing parameters external to the transmission.

SUMMARY OF THE INVENTION

Starting from there, the purpose of the present invention is to provide a new type of method for adapting the rapid filling time of a clutch. This objective is achieved by a method according to the invention with which to adapt the rapid filling time, the clutch is filled by successive rapid filling pulses of increasing rapid filling time, and for each of the rapid filling pulses that serve the adaptation process a reaction produced as a result of the respective rapid filling pulse is monitored, and when for one of these rapid filling pulses a defined reaction is recognized for the first time whereas for the, or for each of the preceding rapid filling pulses the defined reaction was not observed, then as a function of the rapid filling time of the rapid filling pulse for which the defined reaction was recognized for the first time, the adaptation of the rapid filling time is carried out, and in order to determine the defined reaction, for each of the rapid filling pulses used for the adaptation, pressure gradients of the clutch pressure produced as a consequence of the respective rapid filling pulse are evaluated. The rapid filling pulse is preferably a pulse of rectangular shape.

With the method according to the invention for adapting the rapid filling time of a clutch, the adaptation can be made independent of transmission-external influencing parameters. The adaptation takes place on the basis of rapid filling pulses in such manner that for the adaptation, pressure gradients of the clutch pressure produced as a result of the rapid filling pulses are evaluated. Thus, for the adaptation, only transmission-internal influencing parameters are taken into account, so that the adaptation is independent of transmission-external influencing parameters and is therefore more accurate.

The application effort is reduced, since it is not necessary to modify the adaptation for drive aggregates produced by various manufacturers. Moreover the adaptation of the rapid filling time in accordance with the invention is not perceptible by occupants of the vehicle, whereby the driving comfort is increased.

BRIEF DESCRIPTION OF THE DRAWINGS

Preferred further developments of the invention emerge from the description below. Example embodiments of the invention, to which it is not limited, are explained in more detail with reference to the drawings, which show.

DETAILED DESCRIPTION OF THE PREFERRED EMBODIMENTS

Figure 1:
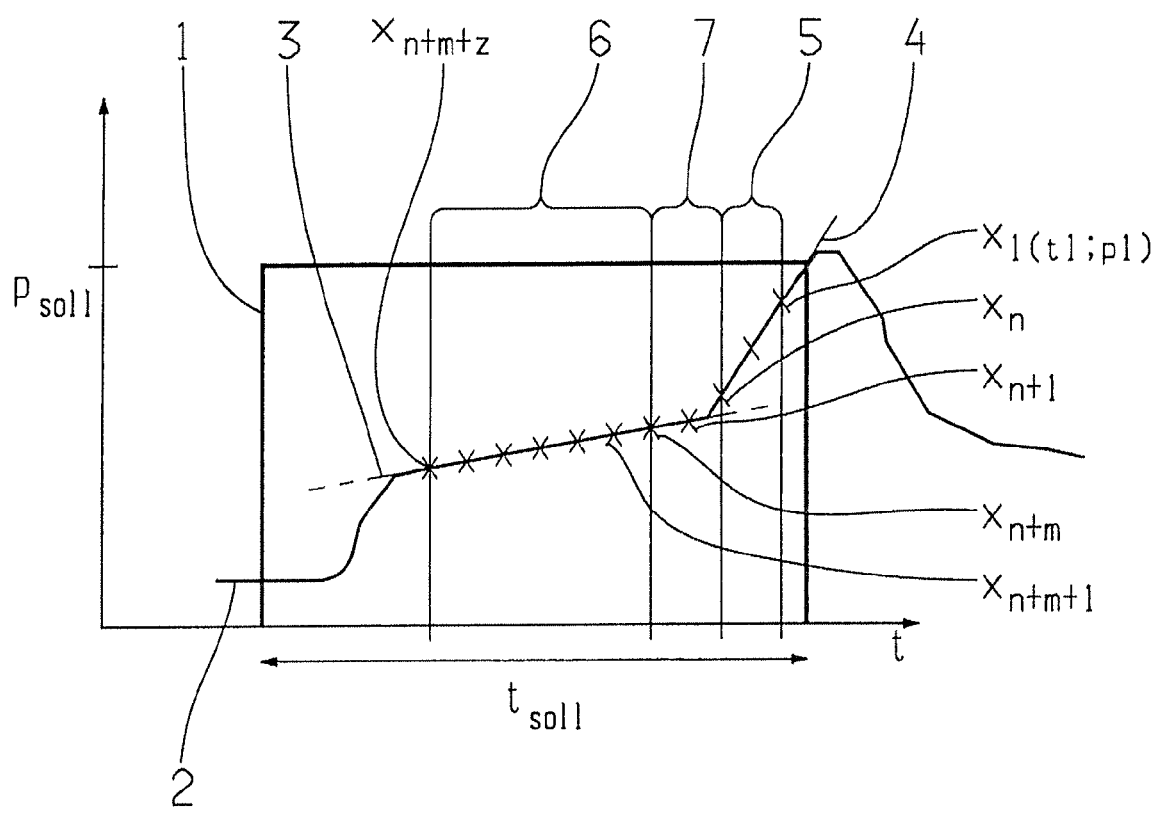
FIG. 1: A first diagram to make clear the method according to the invention for adapting the rapid filling time of a clutch.

The present invention concerns a method for adapting the rapid filling time of a clutch of a drive-train, in particular a clutch of a multiple-clutch transmission, especially a double clutch transmission. By adapting the rapid filling time it is possible to compensate manufacturing tolerances and wear and thus to achieve, over a prolonged operating period, a constant quality of driving and shifting in various operating conditions.

To adapt the rapid filling time, before carrying out the adaptation it is first checked whether operating conditions required for carrying out the adaptation are fulfilled. If so, then the adaptation of the rapid filling time can begin. On the other hand, if this is not so, then no adaptation of the rapid filling time is carried out. As an operating condition it can for example be checked whether sensors whose measurement values will be used during the adaptation of the rapid filling time are in working order.

In addition, for adapting the rapid filling time for or of a clutch, that part of the transmission in which the clutch whose rapid filling time is to be adapted is incorporated, is changed to a neutral position in order to ensure that the adaptation has no effect on the driving behavior and is therefore imperceptible to an occupant of the vehicle.

After the adaptation conditions have been checked and the relevant part of the transmission has been changed to a neutral position, the rapid filling time is adapted in that the particular clutch whose rapid filling time is to be adapted is filled by successive rapid filling pulses of increasing rapid filling time. For each of the rapid filling pulses used for the adaptation, a reaction produced as a consequence of the respective rapid filling pulse is monitored. When the monitored reaction corresponds to a defined reaction, it can be concluded that the rapid filling has been effective and in that case the rapidly filled clutch can therefore transmit torque.

If the defined reaction indicating an effective rapid filling is detected already after the first rapid filling pulse, that rapid filling pulse of the adaptation process is rejected and as the next rapid filling pulse a pulse with shorter rapid filling time is used, so as to ensure that for the first rapid filling pulse of the adaptation process the defined reaction, in the sense of an effective rapid filling, is not observed.

Then, starting from this first rapid filling pulse of the adaptation, for which the defined reaction indicating an effective rapid filling was not observed, the clutch whose rapid filling time is to be adapted is filled by means of successive rapid filling pulses of increasing rapid filling time and, again, for each rapid filling pulse the reaction produced is monitored.

Starting from the first rapid filling pulse with a defined rapid filling time for which the defined reaction was not recognized, thereafter the clutch is filled by successive rapid filling pulses of increasing rapid filling time and, as already mentioned, for each rapid filling pulse the reaction produced as a result of the rapid filling pulse concerned is monitored. When for one of these rapid filling pulses the defined reaction indicating an effective rapid filling is recognized for the first time, whereas in contrast, for at least one previous rapid filling pulse the defined reaction was not observed, then as a function of the rapid filling time for the rapid filling pulse for which the defined reaction was observed for the first time, the rapid filling time adaptation takes place. In detail, here the procedure adopted is preferably that following the rapid filling pulse for which the defined reaction is recognized for the first time, to confirm the defined reaction a rapid filling pulse with identical rapid filling time is delivered and if in that case too the defined reaction is confirmed, then the rapid filling pulse with identical rapid filling time is followed by a rapid filling pulse with a defined, shorter rapid filling time, which is used as the adaptation value for the rapid filling time if no reaction is observed for the rapid filling pulse with the shorter rapid filling time. Thus, the adaptation is a function of the rapid filling time of the rapid filling pulse for which the defined reaction was observed for the first time.

In the context of the present invention, for each rapid filling pulse used for adapting the rapid filling time the defined reaction in the sense of an effective rapid filling is monitored on the basis of evaluating pressure gradients, namely on the basis of pressure gradients of the clutch pressure of the clutch produced as a consequence of the rapid filling pulse concerned. Details of this evaluation of pressure gradients are explained in detail below with reference to FIGS. 1 and 3.

FIG. 1 shows, for an example rapid filling pulse 1 characterized by a defined rapid filling pressure $p_{SOLL}$ and a defined rapid filling time $t_{SOLL}$, a clutch pressure 2 actually produced as a result of the rapid filling pulse. FIG. 1 also demonstrates that for the rapid filling pulse 1 a number of measured values $X_1$ to $X_n$, $X_{n+1}$ to $X_{n+m}$, $X_{n+m+1}$ to $X_{n+m+z}$ of the clutch pressure 2 actually produced are determined, such that each of the measured values $X_i = X_i (t_i; p_i)$; $i=1$ to $n+m+z$ comprises a pressure $p_i$ determined at a time $t_i$.

The measured values X of the clutch pressure 2 actually produced are stored in a digital storage ring of defined storage capacity, such that when the storage ring is completely filled with measured values and a new measured value arrives, the respective oldest value stored in the ring is deleted.

On the basis of the measured values stored in the digital storage ring, for each rapid filling pulse 1 used in the adaptation of the rapid filling time on the one hand reference pressure gradients 3 and on the other hand reaction pressure gradients 4 are determined and when, within a defined evaluation time or evaluation window for the rapid filling pulse concerned, the reaction gradient 4 exceeds the reference pressure gradient 3 by a defined factor or amount, then for the rapid filling pulse 1 the occurrence of the defined reaction in the sense of an effective rapid filling is recognized.

In the diagram of FIG. 1, the reaction gradient 4 substantially exceeds the reference pressure gradient 3, so that for the rapid filling pulse 1 in FIG. 1 it can be assumed as an example that a defined reaction in the sense of an effective rapid filling exists.

As already mentioned, the reaction pressure gradients 4 and reference pressure gradients 3 for each rapid filling pulse are determined using the measured values stored in the digital storage ring, and in the procedure for this the measured values of the clutch pressure 2 actually produced, stored in the storage ring, are divided into at least two groups. A first group 5 of measured values of the clutch pressure 2 actually produced, namely the respectively most recent measured values in the storage ring, are used for determining the reaction gradients 4. In the example embodiment of FIG. 1 these are the measured values $X_1$ to $X_n$. A second group 6 of measured values, namely the respectively oldest measured values stored in the storage ring, is used for determining the reference pressure gradients 3. In the example embodiment shown these are the measurement values $X_{n+m+1}$ to $X_{n+m+z}$.

From FIG. 1 it can also be seen that between the first group 5 and the second group 6 of measured values stored in the storage ring there is third group 7 of measured values in the storage ring, which are not taken into account for determining the reference 3 and reaction 4 pressure gradients, these measured values therefore being ones determined at times between the most recent values forming the first group 5 and the oldest values forming the second group 6. In the example embodiment shown these are the measured values $X_{n+1}$ to $X_{n+m}$.

The capacity of the storage ring corresponds to the sum of the measured values in the three groups 5, 6 and 7.

Figure 2:
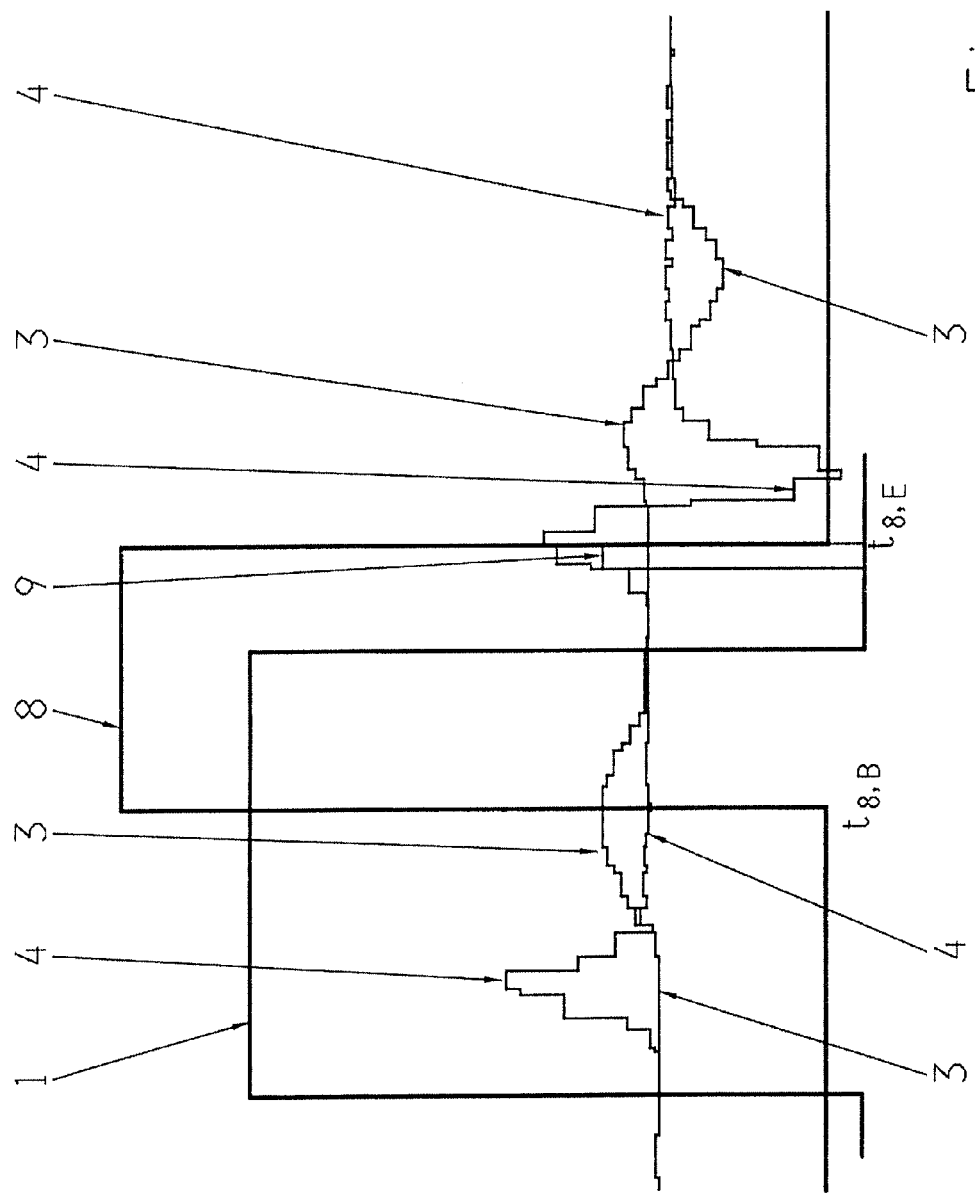
FIG. 2: A second diagram to clarify the method according to the invention.
Figure 3:
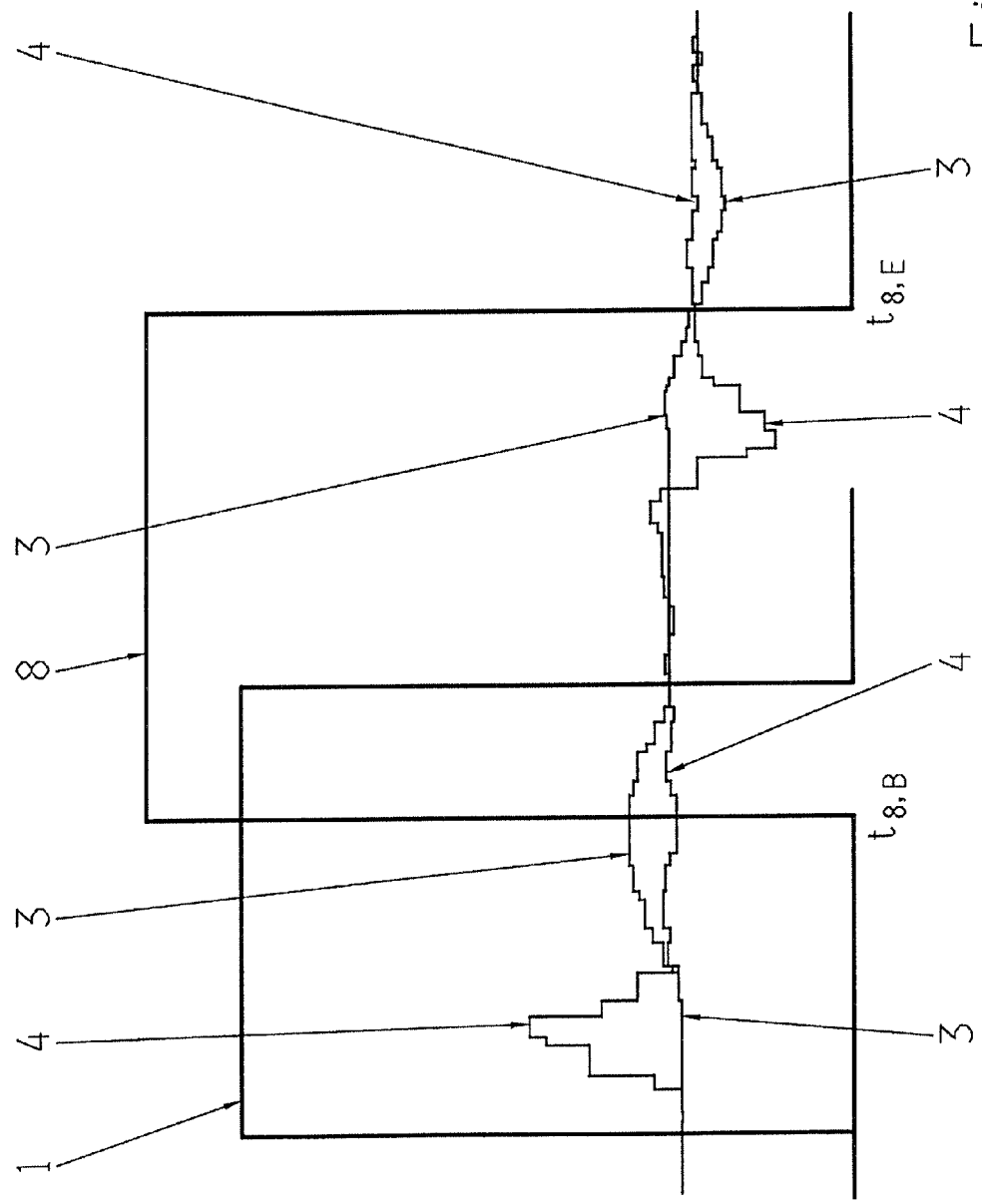
FIG. 3: A third diagram to clarify the method according to the invention.

As already explained, in the adaptation of the rapid filling time, for each rapid filling pulse used for the adaptation, on the one hand reference pressure gradients and on the other hand reaction pressure gradients are determined, namely continuously over the duration of the rapid filling pulse concerned and later in time than the rapid filling pulse, as shown by the variations with time of the curves in FIGS. 2 and 3. Thus, FIGS. 2 and 3 show respective time variations of a rapid filling pressure pulse 1, a reference pressure gradient 3 and a reaction pressure gradient 4, these being evaluated for the determination of the defined reaction within a defined evaluation period 8. For determining the reference 3 and reaction 4 pressure gradients, the respective measured values of the clutch pressure 2 actually produced, as stored in the storage ring, are used and as already mentioned, when a new measured value arrives in the storage ring the respective oldest value is deleted therefrom.

The evaluation period 8 within which the reference 3 and reaction 4 pressure gradients are evaluated in order to determine the defined reaction in the sense of an effective rapid filling, is defined by a beginning $t_{8,B}$ and an end $t_{8,E}$ when, during the rapid filling pulse 1, the reference pressure gradient 3 and/or the reaction pressure gradient 4 exceeds a defined value and when, in addition, the measured clutch pressure 2 exceeds a defined value, namely a defined minimum pressure, and when, furthermore, the reference pressure gradient 3 and/or the reaction pressure gradient 4 is below a defined value, namely a local maximum.

As can be seen from FIGS. 2 and 3, the evaluation period 8 begins in each case at a time $t_{8,B}$ when the reference pressure gradient 3 is below its local maximum.

In the diagram of FIG. 3, during the evaluation period 8 the defined reaction in the sense of an effective rapid filling is not observed, so the evaluation period 8 then ends at time $t_{8,E}$ when the reference pressure gradient 3 and/or the reaction pressure gradient 4 assumes a negative value. In FIG. 3 the reference pressure gradient 3 becomes negative at the end of the evaluation period 8.

In contrast, in FIG. 2 a defined reaction in the sense of an effective rapid filling is observed, so that in FIG. 2, when the defined reaction 9 is recognized at time $t_{8,E}$, the evaluation window or evaluation period 8 for the rapid filling pulse 1 concerned ends.

To determine or calculate the reaction pressure gradient 4 from the measured values $X_i = X_i (t_i; p_i)$; $i=1$ to $n$ in the first group 5 of measured values stored in the storage ring, the procedure adopted is to calculate from those measured values an average value. As already explained, the first group 5 of measured values in the storage ring, used for determining the reaction pressure gradient 4, contains the measured values $X_1$ to $X_n$, so that when an average value is obtained the reaction gradient $GRADIENT_{REACTION}$ can be calculated from the following equation:

$$GRADIENT_{REAKTION} = \frac{\sum_{i=1}^{n}(p_i - p_{i+1})}{n} * k$$

in which k is a time related scanning factor for measured value determination.

The reference gradients $GRADIENT_{REFERENZ}$ are determined from the measured values $X_i = X_i (t_i; p_i)$; $i=n+m+1$ to $n+m+z$ in the second group 6 of measured values stored in the storage ring, and this indeed either by forming an average of the measured values or by forming a linear regression value of the measured values. In this case the second group 6 of measured values used for determining the reference pressure gradients contains the values $X_{n+m+1}$ to $X_{n+m+z}$.

When, to calculate the reference pressure gradients 3 an average value is also formed, the respective reference gradient $GRADIENT_{REFERENZ}$ is obtained from the following equation:

$$GRADIENT_{REFERENZ} = \frac{\sum_{i=n+m+1}^{n+m+z}(p_i - p_{i+1})}{z} * k$$

On the other hand, if the reference pressure gradient 3 is determined by forming a linear regression value of the measured values in the second group 6, then the respective reference pressure gradient $GRADIENT_{REFERENZ}$ is obtained from the following equation:

$$GRADIENT_{REFERENZ} = \frac{\sum_{i=n+m+1}^{n+m+z}(t_i - t')*(p_i - p')}{\sum_{i=n+m+1}^{n+m+z}(t_i - t')^2} * k$$

in which:

$$t' = \frac{\sum_{i=n+m+1}^{n+m+z} t_i}{z}, \quad p' = \frac{\sum_{i=n+m+1}^{n+m+z} p_i}{z}$$

And if, within the defined evaluation period or evaluation window 8 for the rapid filling pulse concerned, the reaction gradient 4 exceeds the reference pressure gradient 3 by a defined factor, then for the respective rapid filling pulse 1 concerned the occurrence of the defined reaction in the sense of an effective rapid filling is recognized.

The adaptation of the rapid filling time according to the invention can also be interrupted. For example, this can be the case when the adaptation conditions required for rapid filling time adaptation are no longer satisfied, or when a motor vehicle is parked. In such a case it can be provided that the previous adaptation results are stored and, once the interruption of the adaptation has ended, the adaptation continues. In that case an interrupted adaptation can be ended. Consequently there is no need to have to end an adaptation necessarily within one driving cycle. Rather, when an adaptation is interrupted values are stored, and when the adaptation is continued they are correspondingly used again.

In the context of the invention it can be provided that the clutch pressure produced as a result of a respective rapid filling pulse is also evaluated in order to detect a possible sticking of the clutch and if a clutch jam or sticking of a clutch piston is detected, then no adaptation of the rapid filling time is carried out.

Sticking of a clutch can be recognized if, before the evaluation period for the gradients of the actual clutch pressure, the clutch pressure exceeds a threshold value that depends on the contact pressure of the clutch.

Figure 4:
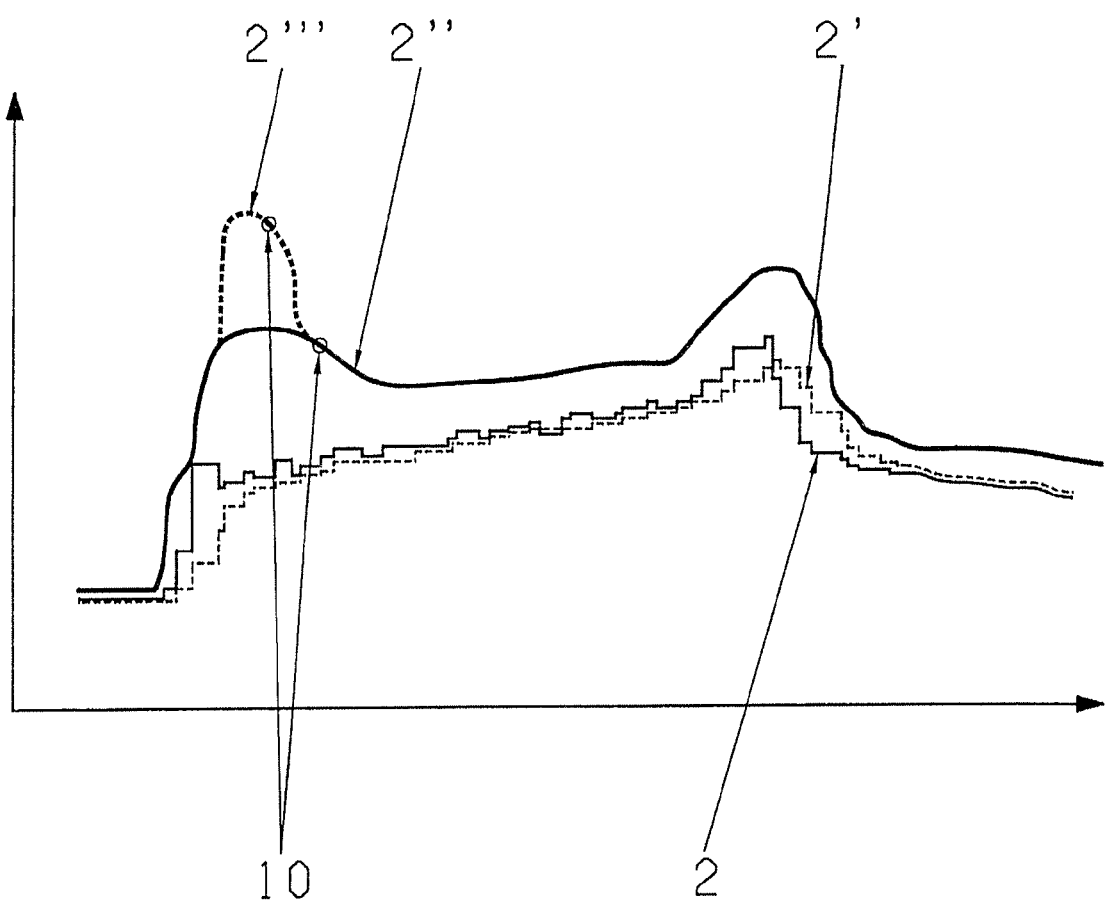
FIG. 4: A fourth diagram to clarify the method according to the invention.

A further possibility for recognizing the sticking of a clutch is illustrated in FIG. 4. Thus, as a function of time t, FIG. 4 shows an actual clutch pressure 2, a filtered clutch pressure 2' when the clutch piston is not sticking, and filtered clutch pressures 2'' and 2''' when the clutch piston is sticking. If the clutch pressure decreases during a rapid filling pulse, this indicates a sticking clutch piston which starts moving again once the sticking has been overcome. A similar thing happens when the reference pressure gradient assumes a negative value during a rapid filling pulse. In FIG. 4 conditions 10 are indexed, in which the filtered clutch pressure decreases during a rapid filling pulse, and in which therefore sticking of the clutch can be concluded.

Figure 5:
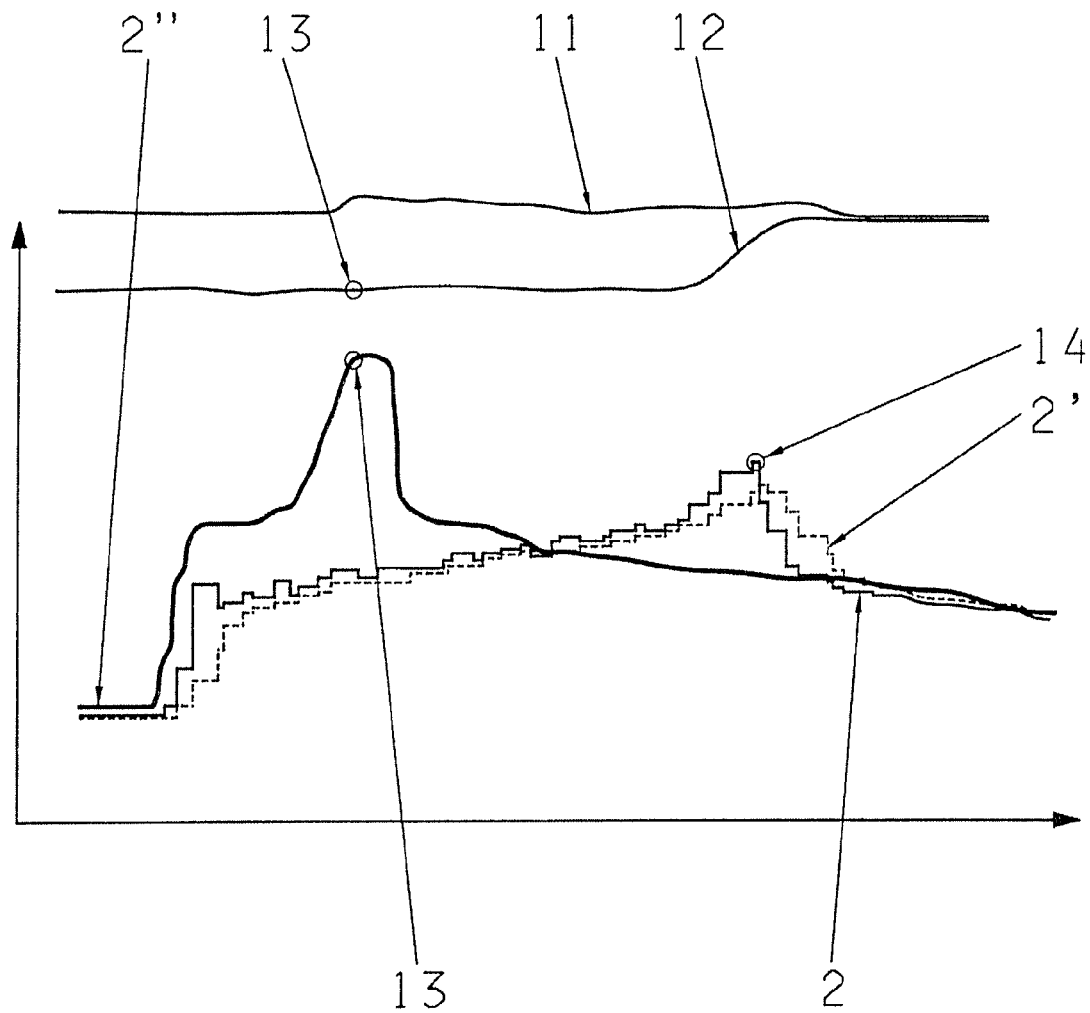
FIG. 5: A fifth diagram to clarify the method according to the invention.

A further possibility for detecting a sticking clutch piston is illustrated by FIG. 5 in which, as a function of time t, an actual clutch pressure 2, a filtered clutch pressure 2' when the clutch piston is not sticking and a filtered clutch pressure 2'' when the clutch piston is sticking, are plotted, together with time variations of a motor speed 11 and a transmission input speed 12. Thus, in the FIG. 5 variant a sticking clutch piston is detected using the motor speed 11 and the transmission input speed 12, in such manner that if an applicable pressure threshold and a corresponding applicable pressure gradient are exceeded and no reaction on the transmission input speed 12 is observed, then sticking of the clutch piston can be concluded. Namely, when the clutch is full the transmission input speed 12 approaches the motor speed 11. The condition indexed 13 in FIG. 5 shows an example representation of a sticking clutch piston. The condition 14 corresponds to an effective rapid filling.

INDEXES

1 Rapid filling pulse
2 Clutch pressure
3 Reference pressure gradient
4 Reaction pressure gradient
5 Group
6 Group
7 Group
8 Evaluation period
9 Defined reaction
10 Condition
11 Motor speed
12 Transmission input speed
13 Condition
14 Condition

The invention claimed is:

1. A method of adapting a rapid filling time of a clutch of a drive-train, the method comprising the steps of:
    filling the clutch for adaptation by at least two successive rapid filling pulses each with increasing rapid filling times,
    for each rapid filling pulse used for the adaptation, monitoring a reaction generated as a result of the respective rapid filling pulse, and
    if a defined reaction is recognized for the first time, for one of the rapid filling pulses, whereas for the, or for each previous rapid filling pulse, the defined reaction was not observed, then as a function of the rapid filling time of that rapid filling pulse, for which the defined reaction was recognized for the first time, the adaptation of the rapid filling time is carried out and for each rapid filling pulse used for the adaptation, to determine the defined reaction, pressure gradients of the clutch pressure produced as a result of the respective rapid filling pulse are evaluated.

2. The method according to claim 1, further comprising the steps of for each of the rapid filling pulses used for the adaptation, determining a number of measured values of the clutch pressure produced and stored in a digital storage,
    from these measured values, determining for each of the rapid filling pulses used for the adaptation, reference pressure gradients and reaction pressure gradients, and
    if, within a defined evaluation period, the reaction pressure gradient either exceeds or is smaller than the reference pressure gradient by either a defined factor or amount, recognizing the occurrence of the defined reaction for the rapid filling pulse concerned.

3. The method according to claim 2, further comprising the step of utilizing a first group of the measured clutch pressure values, determined and stored in the storage, and a second group of the measured clutch pressure values, determined and stored in the storage, for determining the reaction pressure gradients.

4. The method according to claim 2, further comprising the step of determining the evaluation period, for each rapid filling pulse used for the adaptation, in such manner that the evaluation period begins when, during the rapid filling pulse, at least one of the reference pressure gradient and the reaction pressure gradient exceeds a defined value and, in addition, the measured clutch pressure exceeds a defined value, and, furthermore, at least one of the reference pressure gradient and the reaction pressure gradient is below a defined value, and the evaluation period ends either when either the occurrence of the defined reaction is recognized or when at least one of the reference pressure gradient and the reaction pressure gradient adopts a negative value.

5. The method according to claim 3, further comprising the step of determining the reaction pressure gradient from the first group of measured values, determined and stored in the storage, in such manner that an average of the first group of measured values is formed.

6. The method according to claim 3, further comprising the step of determining the reference pressure gradient from the second group of measured values, determined and stored in the storage, in such manner that an average of the second group of measured values is formed.

7. The method according to claim 3, further comprising the step of determining the reference pressure gradient from the second group of measured values, determined and stored in the storage, in such manner that a linear regression value of the second group of measured values is formed.

8. The method according to claim 3, further comprising the step of disregarding at least one measured value, when evaluating the pressure gradients, between the first group of measured values and the second group of measured values.

9. The method according to claim 1, further comprising the step of when, for one of the rapid filling pulses, a defined reaction is recognized for the first time, then following this rapid filling pulse by a rapid filling pulse with an identical rapid filling time to confirm the defined reaction, and, if thereby the defined reaction is confirmed, then following this with a rapid filling pulse with a defined, shorter rapid filling time, which is then used for the adaptation if no reaction is observed for the rapid filling pulse with the shorter rapid filling time.

10. The method according to claim 1, further comprising the step of carrying out the adaptation of the rapid filling time either for or at a clutch associated with a part of the transmission not currently involved in torque transmission, and for this the part of the transmission is brought to a neutral position, and before carrying out the adaptation of the rapid filling time, and
    checking whether operating conditions required for carrying out the adaptation are fulfilled.

11. The method according to claim 1, further comprising the step of, if the adaptation process is interrupted while in progress, storing previous results and then continuing the adaptation process once the interruption ends.

12. The method according to claim 1, further comprising the step of additionally evaluating the clutch pressure produced as a result of the respective rapid filling pulse for the detection of any clutch sticking, and, if clutch sticking is detected, then no rapid filling time adaptation takes place.

13. A method of adapting a rapid filling time of a clutch of a drive-train, the method comprising the steps of:
    filling the clutch by at least two successive rapid filling pulses with increasing rapid filling times;
    monitoring, for each of the rapid filling pulses, a reaction produced as a result of the respective rapid filling pulse;
    if a defined reaction is recognized for the first time for one of the at least two successive rapid filling pulses, or the defined reaction was not observed for the or each of the previous rapid filling pulses, then carrying out the adaptation of the rapid filling time as a function of a rapid filling time of the rapid filling pulse for which the defined reaction was recognized for the first time; and evaluating pressure gradients of the clutch pressure produced as a result of the respective rapid filling pulse, for each rapid filling pulse used for the adaptation, to determine the defined reaction.

* * * * *